UNITED STATES PATENT OFFICE.

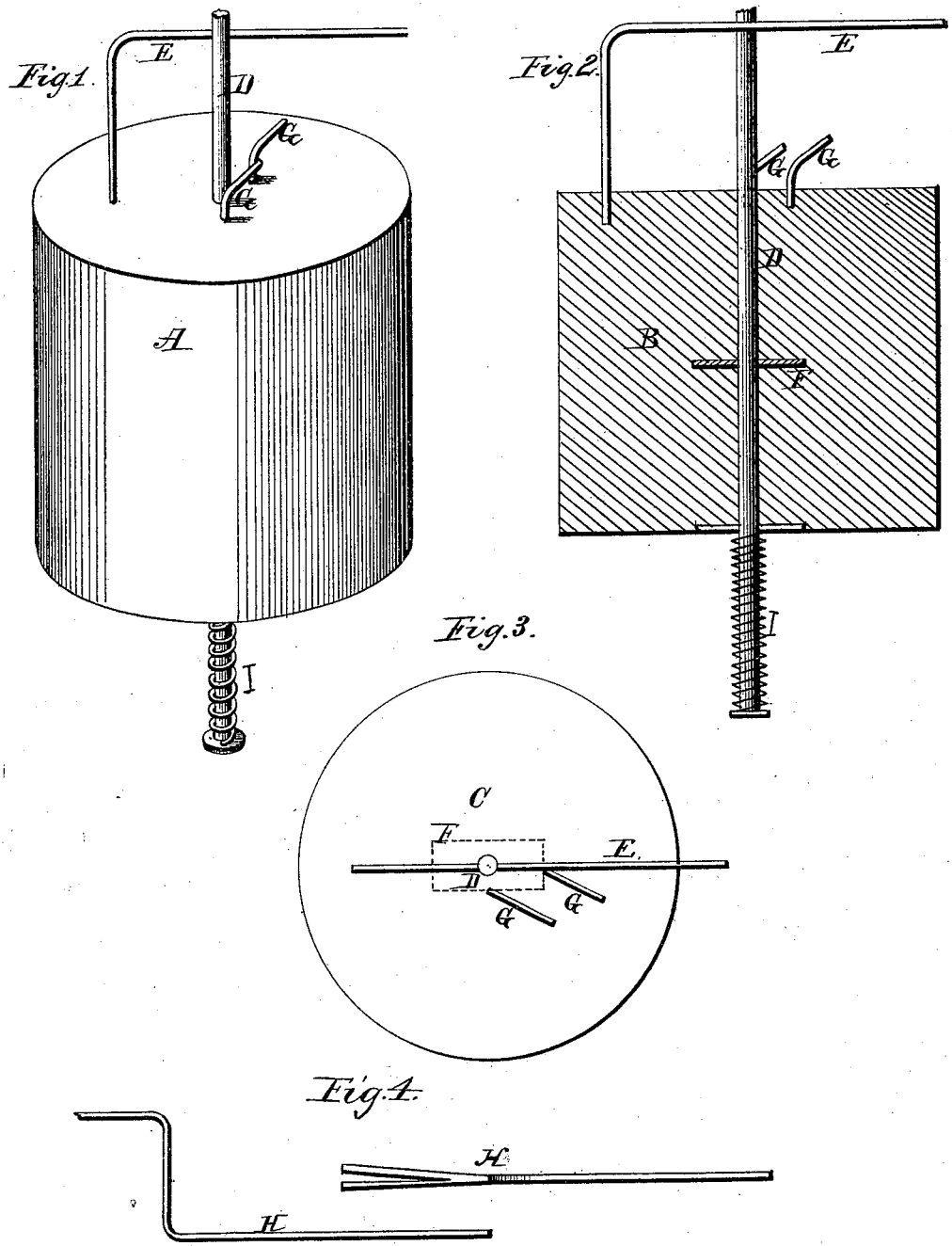

LUCIEN HOURIET, OF SAN JOSÉ, CALIFORNIA.

IMPROVEMENT IN COMPOUNDS FOR SOLDERING BLOCKS.

Specification forming part of Letters Patent No. 171,668, dated January 4, 1876; application filed August 7, 1875.

*To all whom it may concern:*

Be it known that I, LUCIEN HOURIET, of San José, Santa Clara county, California, have invented a new and useful compound, to be used in the manufacture of soldering blocks, which compound is fully described in the following specification, together with the manner of using one form of block.

Figure one of the drawing is a perspective view of a block in the form of a cylinder, with wires for holding articles to be soldered. Fig. 2 is a vertical section, and Fig. 3 is a plan view, of the same. Fig. 4 shows another form of holding-wire.

This device is made of equal parts of powdered charcoal and plaster-of-paris, which, when thoroughly mixed with one-fourth part water and put into molds such as desired—or any form that may be practicable—and allowed to become dry, will form a block or compound, which is used as a soldering or brazing block.

I claim as my invention and desire to secure by Letters Patent—

1. The combination of stem D, spiral spring I, through block A, and wires E, G, and H, substantially as set forth.

2. The combination of charcoal and plaster-of-paris in equal parts, for soldering or brazing blocks.

LUCIEN HOURIET.

Witnesses:
J. H. CLAYTON,
P. M. BURNER.